June 26, 1945.  E. K. CLARK  2,379,398

WATER HEATER APPARATUS

Filed Jan. 13, 1943  2 Sheets-Sheet 1

WITNESSES:

INVENTOR
EARL K. CLARK.
BY
ATTORNEY

June 26, 1945.  E. K. CLARK  2,379,398

WATER HEATER APPARATUS

Filed Jan. 13, 1943  2 Sheets-Sheet 2

INVENTOR
EARL K. CLARK.
BY
ATTORNEY

Patented June 26, 1945

2,379,398

UNITED STATES PATENT OFFICE 2,379,398

WATER HEATER APPARATUS

Earl K. Clark, Mansfield, Ohio, assignor to Westinghouse Electric Corporation, East Pittsburgh, Pa., a corporation of Pennsylvania Application January 13, 1943, Serial No. 472,187

15 Claims. (Cl. 219—38)

My invention relates to a control for tap water heating apparatus and has for an object to provide an improved control of this kind.

A further object of the invention is to provide an improved control of the type set forth which normally maintains the water at a predetermined mean temperature and which may be readily adjusted at will to provide a charge of heated water at a temperature higher than normally provided.

It is a further object of the invention to provide an improved control for a water heater which may be adjusted from a region remote from the heater for varying the mean temperature of the water normally maintained in the heater, said control having provisions, readily adjustable at will, for temporarily increasing the temperature of the water in the heater.

These and other objects are effected by my invention as will be apparent from the following description and claims taken in connection with the accompanying drawings, forming a part of this application, in which:

Fig. 1 is a diagrammatic view of my control applied to a conventional electrically heated tap water heater;

Figs. 2, 3, and 4 are modifications of a portion of the control circuits shown in Fig. 1;

Figure 1:
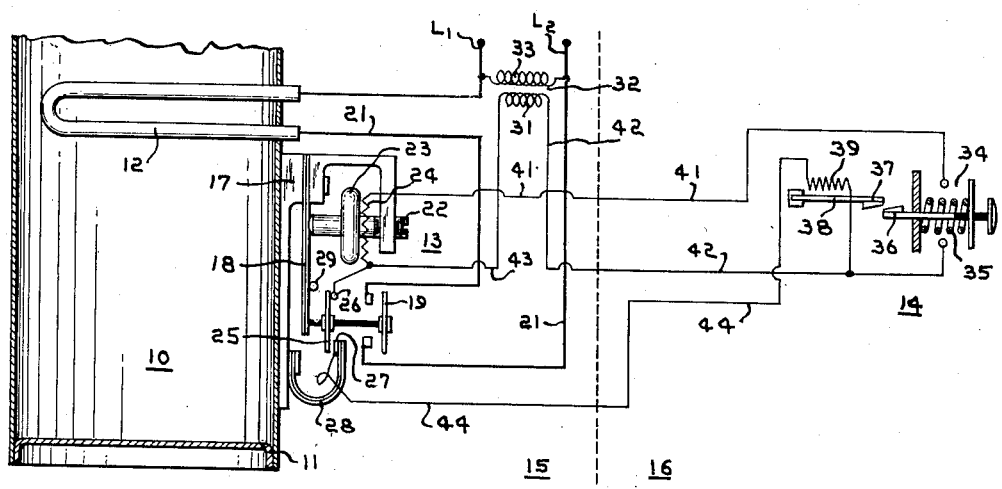

Tap water heaters for residences and the like are usually thermostatically controlled to maintain the temperature of the water between predetermined high and low values. The thermostat for such apparatus is usually in a location not readily accessible and is, therefore, adjusted by a mechanic or service man to continuously provide heated water at the temperature desired by the owner or operator. This operation would be satisfactory if the daily use of hot water were constant. However, the use of hot water usually varies as large demands on the tap water heater occur, for example, during washday. Obviously, other conditions may cause wide variations in the use of hot water in the household. If the thermostat is set to provide for the usual consumption of hot water, the drawing of quantities greater than usual will unduly depress the temperature of the supply. If the thermostat is set to provide hot water at a relatively high temperature to meet abnormal or peak demands, then the heating is carried out uneconomically during normal periods of consumption.

In accordance with my invention, the thermostat for the heater is set to provide hot water at a temperature just high enough to assure an adequate supply of hot water during ordinary or normal use. In order to provide a higher temperature supply of water for a peak demand, a device such as a push button switch readily accessible to the operator is provided for further adjusting the thermostat to increase the water temperature at which the thermostat operates to terminate the heating of the water. This switch may be located in the kitchen or some other accessible location remote from the heater and its thermostat, it being understood that water heaters are usually installed in basements or locations not readily accessible to the housewife. The arrangement is such that, after the water has been heated to the elevated temperature to meet the peak demand, the normal adjustment of the thermostat is automatically reestablished so that future cycling of the heater provides heated water at the normal or economic temperature. Means accessible to the operator may be provided for adjusting the elevated temperature of the water necessary for the large demand. Also, means readily accessible to the operator may be provided for adjusting the usual or normal temperature of the heated water.

Figure 5:
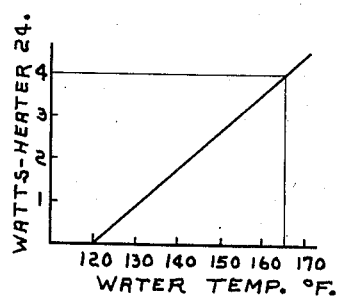
Fig. 5 is a chart applicable to Figs. 1 to 4, inclusive.

Reference will now be had to Figs. 1 and 5 which diagrammatically illustrate one embodiment of my invention. The tap water heater is generally shown at 10 and includes a tank 11 and an electric heater 12 of any well-understood construction for heating the water. The temperature of the water is controlled by a thermastat structure carried by the tank and generally indicated by the numeral 13. A control device for temporarily increasing the temperature of the water and readily accessible to the operator or housewife is generally shown at 14 in a region remote from the tap water heater 10. For example, the tap water heater 10 may be installed in a basement, indicated at 15, and the control device 14 disposed in the kitchen, generally indicated by the numeral 16.

The thermostat structure 13 includes a frame 17 carried by the tank 11 and supporting one end of a heat-responsive element such as a bimetal strip 18. The arrangement is such that the temperature of the bimetal strip 18 closely follows the temperature of the water in the tank 11. As the bimetal strip 18 is heated, it moves to the right as viewed in Fig. 1 and, conversely, as it cools, it moves to the left. The free end of the bimetal strip is connected to, but insulated from, a main switch 19 which is closed and opened in response to respective predetermined low and high temperatures of the strip 18. The switch 19 is connected in series with the main heater 12 and an electric circuit 21 having a voltage of, for example, 230 volts impressed thereon. The source of power for the electric circuit 21 is represented by main line conductors $L_1$ and $L_2$.

The thermostat structure 13 includes an adjusting screw 22 which bears upon the bimetal strip 18 for stressing the same and regulating the temperatures at which the strip 18 opens and closes the main switch 19, as is well understood. The adjusting screw 22 is usually set by a service man to determine the high and low temperatures of the water in the tank for normal operation. For example, the setting may be such that the water in the tank is maintained at a mean temperature of 120° F. The adjusting screw 22 includes a closed chamber 23 having an expansible fluid therein which, when heated, increases the bias on the bimetal strip 18 and, therefore, increases the temperature at which the strip 18 functions to open the main switch 19. The fluid in the chamber 23 is heated by a relatively small control heater 24 disposed adjacent the closed chamber 23.

Energization of the control heater 24 is controlled by a switch structure operated by the bimetal strip 18 and including a movable bridging member 25 which cooperates with a stationary contact 26 and a second contact 27 carried by a bimetal element 28 which also responds to the temperature of the water in the tank 11. Movement of the bimetal element 18 to the right may be limited by the stationary contact 26 or a separate stop shown at 29 may be provided for this purpose.

During normal operation or periods when the control heater 24 is deenergized, the contact 27 is positioned by the bimetal support 28 so that it is not engaged by the movable bridging member 25 in the heated position of the main bimetal element 18 or the position illustrated in Fig. 1. However, when the temperature of the water in the tank 11 is increased to a value above the normal temperature, the bimetal support 28 will move the contact 27 to the left, as viewed in Fig. 1, so that the bridging member 25 will bridge the contacts 26 and 27 when the bimetal 18 moves the switch 19 to its "off" position for a purpose to be described more in detail hereinafter.

Preferably, the control heater 24 is energized by a low voltage circuit of, for example, 6 volts derived from the secondary 31 of a step-down transformer 32. The primary 33 of the latter may be connected directly across the line conductors $L_1$ and $L_2$. Energization of the control heater 24 is under control of the control device 14, the latter including a push button switch 34 which is biased to its open position by a spring 35. The push button switch 34 is retained in its closed position by a latching mechanism including first and second latching members 36 and 37 which are engaged in the closed position of the switch and which retain the switch in such position in opposition to the bias of the spring 35. The latching member 37 is carried by a bimetal element 38 which when heated moves upwardly and releases the latching members 36 and 37 so that the spring 35 moves the switch 34 to its open position. Heating of the element 38 is effected by a small electric heater 39.

As clearly shown in Fig. 1, one terminal of the switch 34 is connected by a conductor 41 to one terminal of the control heater 24 while the other terminal of the switch 34 is connected by a conductor 42 to one terminal of the transformer secondary 31. The opposite terminal of the transformer secondary 31 is directly connected by conductor 43 to the opposite terminal of the control heater 24 and to the stationary contact 26. The contact 27 which is moved by the bimetal element 28 is connected by means of a conductor 44 to one side of the heater 39, the opposite side of the heater 39 being directly connected to the conductor 42 and, therefore, to one side of the transformer secondary 31.

*Operation*

The operation of the control system shown in Fig. 1 will now be described. As shown in the drawings, the push button switch 34 is open so that the thermostat structure 13 functions to maintain the water in the tank 11 at a temperature determined by adjusting screw 22, or the temperature maintained during normal operation. As the switch 34 is open, the control heater 24 is deenergized so that the bimetal strip 18 opens and closes its switch 19 at temperatures determined by the setting of the adjusting screw 22. In the example cited, the mean water temperature at this time is approximately 120° F. The switch 19 is shown open, which indicates that the temperature of the water is above the temperature at which the switch is closed, for example, 118° F. As water is drawn from the tank 11, the temperature of the water drops and, when it has been depressed to 118° F., the bimetal 18 closes the switch 19 for energizing the heater 12. As the water temperature rises, the bimetal 18 moves in opposition to the stress provided by the adjusting screw 22 and, when the temperature of the water has been elevated to approximately 122° F., the switch 19 is opened for deenergizing the heater 12. As the switch 19 is moved to its open position, the bridging member 25 is moved into engagement with the stationary contact 26. However, at the relatively low temperatures maintained during normal operation, the contact 27 is maintained out of the path of movement of the bridging member 25 by the bimetal support 28 so that the bridging member 25 and its associated contacts 26 and 27 perform no function during normal operation of the system.

When it is desired to elevate the temperature of the water in the tank 11 for an expected increased demand, the push button switch 34 is closed manually and is latched closed by the engaging latching members 36 and 37. Accordingly, the control heater 24 is energized by the secondary 31 of the transformer through circuit, including the conductors 41, 42, and 43 and the push button switch 34. Accordingly, heat is imparted to the fluid in the enclosed chamber 23 so that the bias on the bimetal element 18 is increased. The latter will now operate to open the switch 19 at a much higher temperature, for example, 165° F., assuming that the heater 24 consumes 4 watts. See the diagram of Fig. 5. The increase in the bias on the element 18 closes the switch 19 for energizing the heater 12, and the temperature of the water in the tank 11 is now increased until it reaches approximately 165° F., at which time the switch 19 is opened. The increase in the temperature of the water causes the bimetal support 28 to move its contact 27 to the left so that when the element 18 opens the switch 19, it also causes engagement of the bridging member 25 and the contacts 26 and 27. The latter operation energizes the small heater 39 by means of a circuit extending from the transformer secondary 31 and including the conductors 43, 44, and 42. This circuit may be clearly traced in Fig. 1.

The energization of the heater 39 heats the bimetal member 38 and deflects the latching member 37 away from the member 36, so that the spring 35 opens the push button switch 34. Accordingly, the control heater 24 is deenergized and the fluid in the chamber 23 is cooled. The apparatus then functions, as described heretofore, to maintain the water in the tank 11 at its normal mean temperature of 120° F. and will continue to do so until the push button switch 34 is again closed. From the foregoing description, it will be apparent that the operator may obtain a full charge of water in the tank 11 at the elevated temperature of 165° F. for an expected increased demand, after which the control is automatically adjusted to cycle the heater to maintain the normal mean water temperature of 120° F.

Figure 2:
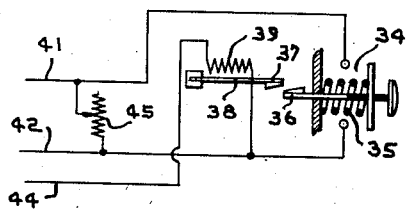

Reference will now be had to Figs. 2 and 5 showing an embodiment of the invention which functions in the same manner as described heretofore, except that the normal temperature of the water may be varied from a remote point, such as the kitchen 16. This operation is accomplished by providing an adjustable rheostat 45 connected across the conductors 41 and 42. The rheostat 45 is movable from an open position, wherein the control heater 24 is deenergized and wherein the system of Fig. 2 functions in exactly the same manner as that described in Fig. 1, to various other positions wherein the wattage of the control heater 24 is varied. By varying the wattage of the heater 24, the bias on the main thermostat element 18 is changed and the temperatures at which it opens and closes the switch 19 will be changed. The water temperature corresponding to the different wattages of the control heater 24 is clearly shown in Fig. 5. It will be understood that only that portion of the circuit shown in Fig. 1 which is modified, is disclosed in Fig. 2, and that the conductors 41, 42, and 44 of Fig. 2 are connected to the portion of the system disposed in the basement 15, in the same manner as shown in Fig. 1. In this connection, what has been said for Fig. 2 applies also to Figs. 3 and 4.

Figure 3:
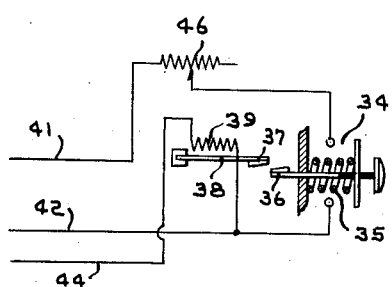

Reference will now be had to Figs. 3 and 5, which show an embodiment of this invention wherein the thermostat structure 13 operates in the same manner as disclosed in Fig. 1 during normal operation, but wherein the temperature of the water desired for a peak or increased demand may be varied. This is accomplished by providing an adjustable rheostat 46 in the kitchen adjacent the push button 34, which rheostat 46 is connected in series with the control heater 24 and is energized only during periods when the push button switch 34 is closed. The rheostat 46 will vary the wattage of the heater 24 and, therefore, the elevated temperature of the water as shown in Fig. 5.

Figure 4:
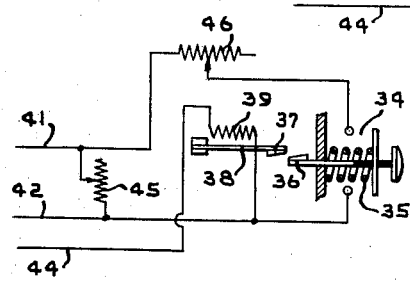

The embodiment shown in Fig. 4 functions as a combination of the embodiments shown in Figs. 2 and 3, as both the rheostats 45 and 46 are employed, which rheostats are disposed adjacent the push button switch 34. In the latter embodiment, the rheostat 45 functions during normal operation to control the wattage of the control heater 24 and, therefore, the temperature of the water normally maintained. The rheostat 46 functions in the same manner as disclosed in Fig. 3, to control the energization of the heater 24 during periods when the push button 34 is closed and, therefore, governs the elevated temperature of the water.

Figure 6:
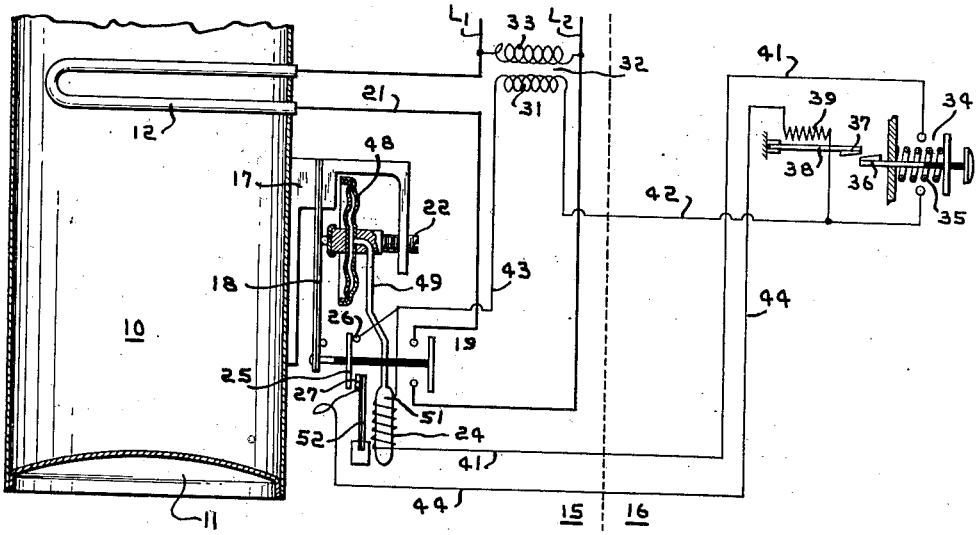
Fig. 6 is a view similar to Fig. 1 and showing a further embodiment of the invention.

Reference will now be had to Fig. 6, which shows an embodiment of the invention similar to Fig. 1 except that a different form of expansible chamber for adjusting the main thermostatic element 18 is employed, and wherein the contact element 27 is actuated in a different manner. The expansible chamber in Fig. 6, shown at 48, is of the wafer type and is connected by means of a relatively small tube 49 to a bulb or reservoir 51 for the expansible fluid. The control heater 24 is arranged in heat exchange relation with the bulb 51 to heat the same and expand the fluid therein, and is also disposed in heat transfer relation with a bimetal element 52 which carries the contact 27. During normal operation, the system disclosed in Fig. 6 functions in exactly the same manner as the system shown in Fig. 1. During periods, however, when the temperature of the water is to be elevated for an increased demand, the heater 24, which is energized by the closing of the push button switch, not only heats the fluid in the bulb 51 for expanding the wafer 48, but also heats the bimetal support 52 and moves the contact 27 into the path of movement of the bridging member 25. During normal operation, the contact 27 is out of the path of movement of the bridging member 25 and is only moved into the path of movement of the latter when its bimetal support 52 has been heated by the heater 24. The contacts 26 and 27 are closed, of course, when the main bimetal 18 moves the switch 19 to its open position. As the operation of the embodiment shown in Fig. 6 is, otherwise, similar to that described in connection with Fig. 1, no further reference to the operation of Fig. 6 is deemed necessary.

Figure 7:
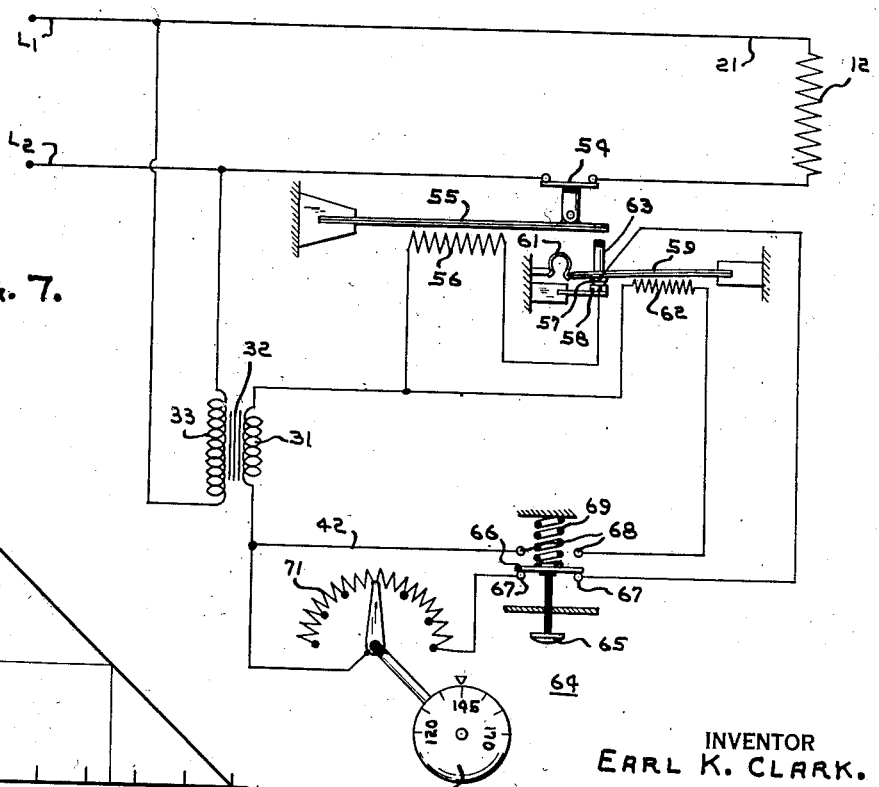
Fig. 7 is a diagram of the electrical connections of another form of my improved control system.
Figure 8:
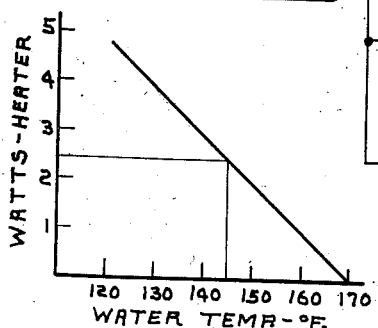
Fig. 8 is a chart applicable to Fig. 7.

Reference will now be had to Figs. 7 and 8, which illustrate a further embodiment of the invention. In Fig. 7, the main heater for the water is shown at 12, connected in a circuit extending from the line conductors $L_1$ and $L_2$ and controlled by a switch 54. The switch 54 is opened and closed in response to predetermined respective high and low temperatures of the bimetal element 55, which receives heat from the water being heated and from a control heater shown at 56. The amount of current consumed by the heater 56 is variable, as described hereinafter, to vary the temperature of the water at which the switch 54 is operated. It will be assumed that the bimetal element 55 opens and closes the switch at a mean temperature of 170° F., so that if the heater 56 is deenergized, the water in the tank will be maintained at a mean temperature of 170° F. This temperature will be changed as heat is imparted to the element 55 by the heater 56 in amounts varying inversely with the rate of energization of the heater 56. The heat supplied to the bimetal 55 by the heater 56, therefore, supplements the heat received from the water so that if an increment of heat is delivered to the element 55 by the heater 56, this increment of heat is not required to be furnished by the water. Therefore, since the bimetal element 55 is adjusted to operate at a basic temperature of 170° F., the temperature rise maintained in the water is the arithmetical difference between the temperature rise corresponding to 170° F. and the temperature rise of the biemtal element 55 due to the heat developed by the heater 56. This operation is readily seen from the chart of Fig. 8 wherein the value of the abscissa at a given point on the curve, say 140° F., is the value of temperature rise in the water above ambient temperature and that the complementary value of this curve, that is, the distance on the abscissa from 140° F. to 170° F., or 30° F. temperature rise, is the temperature rise effected by the heat generated in the heater 56.

The control heater 56 is energized from the secondary 31 of the step-down transformer 32 by means of a circuit, including normally closed contacts 57 and 58. The movable contact 57 is carried by a bimetal element 59, fixed at one end and engaging an overcenter spring 61 at its opposite end. The arrangement is such that the spring 61 will maintain the bimetal 59 in either a switch-closed position or a switch-open position. The bimetal 59 is moved to its switch-open position by heat received from a relatively small heater 62 when energized. The element 59 will be retained in its switch-open position until a mechanical force is applied thereto to actuate it to its switch-closed position. This mechanical force is provided by the main bimetal 55 when moved to its switch-open position. A stop member 63 is carried by the bimetal 59 and is moved into engagement with the bimetal 55 when the bimetal strip 59 is heated. The bimetal strip 59 is moved to its switch-closed position by the bimetal strip 55 and stop member 63 as the strip 55 moves to its switch-open position. The bimetal 59 is retained in its switch-closed position by the spring 61 until further heating of the control heater 62.

Energization of the two heaters 56 and 62 is controlled by a control device, generally indicated at 64 and remotely disposed with respect to the heater and its associated thermostatic structure. The control device 64 includes a double-throw push button 65, having a movable contact 66 which normally bridges stationary contacts 67 and which may be manually actuated to bridge stationary contacts 68. The push button 65 is biased to its normal position by means of a spring 69. The remotely-disposed control device 64 also includes an adjustable rheostat 71 actuated by a knob 72, having suitable indicia thereon for indicating the mean temperature of the water which is maintained by the heater 12.

As clearly shown in Fig. 7, the rheostat 71, the stationary contact 67, and the contacts 57 and 58 are connected in series with the control heater 56 in a circuit connected to the secondary 31 of the step-down transformer. The heater 62 is also connected in a second circuit energized by the secondary 31 of the transformer and controlled by the bridging member 66 and stationary contacts 68.

Operation

It will be assumed that it is desired to maintain a normal mean water temperature of 145° F. Accordingly, the operator or housewife would set the knob 72 for 145° F. wherein approximately 2½ watts are dissipated in the heater 56, as shown in Fig. 8. Normally, the bimetal 59 is in the switch-closed position so that the heater 56 is energized by means of the circuit described heretofore, and including the closed contacts 67 and the closed contacts 57—58. With this rate of energization of the heater 56, the bimetal 55 operates to open and close its switch 54 to maintain a mean water temperature of 145° F.

If higher temperature water is desired for an expected large demand, the push button 65 is depressed, opening the circuit at the contact 67 and closing the circuit through the heater 62 by the bridging of the contact 68 by the movable contact 66. The arrangement is such that the heater 62 rapidly heats the bimetal 59 for moving the latter upwardly in switch-opening direction. When the operator releases the push button 65, the heater 62 is deenergized, but, as described, the spring 61 functions to hold the bimetal 59 up with its contacts 57 and 58 open. The operation of the push button 65 just described deenergizes the control heater 56 as the circuit is open now at the contacts 57—58. Movement of the push button 65 to its normal position, or the position shown, will, therefore, not re-energize the heater 56 as contacts 57 and 58 are open, but such movement of the push button 65 will deenergize the heater 62. The actuation of the push button 65, just described, will cause the main switch 54 to close because the control heater 56 is deenergized and because the upward movement of the stop 63 will close the switch 54 if the latter happened to be open at this time.

Heating of the water is initiated by the closing of the switch 54 and its temperature will continue to rise until it has reached approximately 170° F., or the basic temperature at which the bimetal 55 operates. This operation provides a full charge of water at 170° F. for a large demand. When the bimetal 55 operates to open the switch 54 at the 170° F. water temperature, the bimetal 55, by means of the stop or projection 63, forces the bimetal 59 downwardly and, therefore, closes the contacts 57 and 58. The apparatus is now in its normal position to further cycle the switch 54 and maintain the 145° F. water temperature as the control heater 56 is again energized and dissipates the 2½ watts into heat which is imparted to the bimetal 55.

From the foregoing description, it will be apparent that I have provided improved control apparatus for tap water heaters whereby the water is heated, economically, to a temperature sufficiently high for normal demands and whereby the temperature may be readily increased temporarily for greater demands, after which the control is automatically conditioned to maintain the heated water at the normal economic temperature. The adjusting of the control is effected merely by actuation of a push button arranged in any desired location which may be remote from the heater. In this connection, low voltage wiring connects the main control and the push button station so that the wiring of these elements may be readily and inexpensively installed in new or existing buildings.

An additional function provided by my improved control resides in adjusting, at will, the temperatures of the water during normal heating and/or during the heating for increased demands, these adjustments being also effected from locations remote from the heater and by the manipulation of a simple rheostat or other current regulating device.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. The combination with tap water heating apparatus including a tank for containing the water and a heater for heating the water, of a control therefor comprising mechanism responsive to predetermined high and low temperatures of the water for respectively terminating and initiating operation of the heater, means for adjusting said mechanism at will for increasing the temperature of the water to which the mechanism responds to terminate operation of the heater in order to provide temporarily greater storage of heat, and means for rendering said adjusting means inactive in response to said increased water temperature, said mechanism then operating to control the heater in response to said predetermined high and low temperatures of the water.

2. The combination with tap water heating apparatus having a container for the water and a heater for heating the water, of a control therefor comprising a switch for controlling energization of the heater, a thermostatic element responsive to the temperature of the water for opening and closing said switch, adjusting means including an electrical element for varying the temperature of the water to which the thermostatic element responds to open said switch, said thermostatic element being effective, in one position of the adjusting means, to open and close the switch in response to predetermined high and low temperatures of the water, respectively, and effective in a second position of the adjusting means to open the switch in response to an elevated temperature of the water higher than said predetermined high temperature, and means responsive to said elevated temperature of the water for actuating the adjusting means from its second position to its first position.

3. The combination with a tap water heating structure including a tank for containing the water and a heater for heating the water, of a control therefor comprising a switch for controlling energization of the heater, a thermostatic element for opening and closing said switch in response to variations in the temperature of the water, an electrically-operated device for adjusting said thermostatic element and including a control member manually movable from a first position, wherein said thermostatic element opens its switch in response to a predetermined high temperature of the water, to a second position, wherein the thermostatic element opens its switch in response to an elevated temperature of the water higher than said predetermined high temperature, and means responsive to said elevated temperature of the water for actuating the control member from its second position to its first position.

4. The combination with tap water heating apparatus having a container for the water to be heated and means for heating the water, of a control therefor comprising a switch for controlling energization of the heating means, a thermostatic element responsive to the temperature of the water for operating said switch, means for adjusting the thermostatic element and including an electrical device for changing the temperature to which said element responds to open the switch, a control switch for the electrical device and normally disposed in a first position wherein the thermostatic element opens and closes its switch in response to predetermined high and low temperatures of the water, said control switch being manually movable to a second position for elevating said predetermined high temperature, a latch for retaining said control switch in its second position and means actuated by the thermostatic element for releasing the latch and moving the control switch to its first position in response to said elevated temperature of the water.

5. The combination as claimed in claim 3 including means manually adjustable at will for varying the elevated temperature of the water at which the thermostatic element opens the switch.

6. The combination with a tap water heating structure having a tank for containing the water and a heater for heating the water, of a control therefor comprising a switch for controlling energization of the heater, a thermostatic element for opening and closing said switch in response to respective predetermined high and low temperatures of the water, an electrically-operated device for adjusting said thermostatic element so that the element responds to an elevated temperature of the water, higher than said predetermined high temperature, to open the switch, a control switch for said electrically-operated device and movable from an open position wherein the device is inactive to adjust said element, to a closed position wherein the device functions to adjust the element, and means responsive to said elevated temperature of the water and actuated by said thermostatic element for moving said control switch to its open position.

7. The combination with a tap water heating structure having a tank for containing the water and a heater for heating the water, of a control therefor comprising a switch for controlling energization of the heater, a thermostatic element responsive to the temperature of the water for opening and closing said switch, an electrically-heated device for adjusting the temperature to which the thermostatic element responds to open the switch, a control switch for controlling the energization of the electrically-heated device and movable to a first position wherein the device is substantially deenergized so that the thermostatic element responds to predetermined high and low temperatures of the water for respectively opening and closing said switch, said control switch being manually movable to a second position for energizing said device so that the thermostatic element operates to open the switch at an elevated temperature of the water, higher than said predetermined high temperature, and means responsive to said elevated temperature of the water for actuating the control switch to its first position.

8. The combination with a tap water heating structure having a tank for containing the water and means for heating the water, of a control therefor comprising a thermostat carried by the tank and including a switch for controlling energization of the heating means and an element responsive to the temperature of the water for opening and closing the switch, an electrically-operated device for adjusting the temperature to which the temperature-responsive element responds to open the switch, a control switch remotely disposed with respect to the thermostat and controlling the energization of the electrically-operated device, said control switch being movable to a first position wherein said device is substantially deenergized so that the temperature-responsive element responds to predetermined high and low temperatures of the water for respectively opening and closing said switch, said control switch being manually movable to a second position for energizing said device so that the temperature-responsive element operates to open the switch at an elevated temperature of the water higher than said predetermined high temperature, a current regulator connected in series with the electrically-operated device and manually adjustable at will for varying said elevated temperature of the water at which the temperature-responsive element operates to open the switch and means responsive to said elevated temperature of the water for actuating the control switch to its first position.

9. The combination with a tap water heating structure having a tank for containing the water and a heater for heating the water, of a control therefor comprising a switch for controlling energization of the heater, a thermostatic element responsive to respective predetermined high and low temperatures of the water for opening and closing said switch, an electrically-heated device for adjusting said thermostatic element and effective, when energized, to increase the temperature to which the thermostatic element responds to open the switch to a second predetermined high value, a control switch for said device biased to its open position and manually movable to a closed position, a latch for retaining the control switch closed and means responsive to said second predetermined high temperature of the water for releasing said latch.

10. The combination with tap water heating apparatus including a container for the water and means for heating the water, of a control therefor comprising a switch for controlling energization of the heating means, a heat-responsive element carried by the container for opening and closing the switch in response to respective high and low temperatures of the water, adjusting means for the heat-responsive element including an electrical heater which when energized increases said high temperature to which the heat-responsive element operates to open the switch, a control switch remotely disposed with respect to said container for controlling energization of said heater, said control switch being biased to its open position and manually movable to its closed position, a latch for retaining the control switch closed and having an electrically-operated mechanism for releasing the latch, an electrical circuit for energizing said releasing mechanism, switching means controlling said circuit and means responsive to said increased high temperature of the water for closing said electrical circuit.

11. The combination with a tap water heating structure having a tank for containing the water and means for heating the water, of a control therefor comprising a thermostat carried by the tank and including a switch for controlling energization of the heating means and an element responsive to predetermined high and low temperatures of the water for respectively opening and closing the switch, means for adjusting said temperatures to which the temperature-responsive element responds and including an electric heater, an adjustable current regulator remotely disposed with respect to the thermostat for controlling the degree of energization of the heater, a control switch shunted across the current regulator for controlling energization of the heater and biased to an open position, said control switch being manually movable to a closed position for elevating the predetermined high temperature at which the temperature-responsive element opens its switch, means for latching the control switch in its closed position and means responsive to said elevated temperature of the water for releasing the latching means whereby the control switch is actuated to its open position.

12. The combination as claimed in claim 11 including a second adjustable current regulator connected in series with the control switch for varying the degree of energization of the heater with the control switch closed and, therefore, the elevated predetermined high temperature at which the temperature-responsive element opens its switch.

13. In apparatus for controlling a tap water heating structure having a tank for the water and means for heating the water, the combination of a switch for controlling energization of the heating means, a member responsive to the temperature of the water for operating said switch, a heater for imparting heat to the temperature-responsive member at various selected rates for varying the water temperatures at which the temperature-responsive member operates the switch, the construction and arrangement being such that said water temperatures are varied inversely as the rate of energization of the heater is varied, a current regulator remotely disposed with respect to the heater for controlling the degree of energization thereof, normally closed switching means controlling energization of the heater, means manually operated at will for opening the switching means and deenergizing the heater so that the temperature-responsive member operates to open its switch at a maximum water temperature and means for closing the switching means, automatically, in response to said maximum temperature of the water.

14. In apparatus for controlling a tap water heating structure having a tank for the water and means for heating the water, the combination of a switch for controlling energization of the heating means, a member responsive to the temperature of the water for operating said switch, a heater for imparting heat to the temperature-responsive member at various selected rates for varying the water temperatures at which the temperature-responsive member operates the switch, the construction and arrangement being such that said water temperatures are varied inversely as the rate of energization of the heater is varied, a current regulator remotely disposed with respect to the heater for controlling the degree of energization thereof, switch means controlling energization of the heater and normally closed, an electrical device energizable for opening the switch means, a manually-operated control switch for controlling energization of said device, and means responsive to movement of said temperature-responsive member in switch-opening direction for closing said switch means.

15. In apparatus for controlling a tap water heater having a tank for the water and means for heating the water, the combination of a main switch for controlling energization of the heating means, a member responsive to the temperature of the water for opening and closing the main switch, means biasing said member and adjustable for varying the temperatures at which the main switch is opened and closed, said biasing means including a closed vessel having an expansible fluid therein, a heater for expanding the fluid and increasing the effect of the biasing means, a control switch for controlling energization of the heater, said control switch being biased to its open position and manually movable to its closed position, a latch for retaining the control switch closed, electrical means energizable for releasing the latch, a switching mechanism for controlling energization of the electrical means and including relatively movable contacts, one of said contacts being movable toward the other contact by the temperature-responsive member as the latter opens the main switch, and a heat-responsive device for supporting said other contact and disposed in heat transfer relation with said heater, said heat-responsive device being effective to move the other contact toward said one contact when the heat-responsive device is heated.

EARL K. CLARK.